Dec. 26, 1939.  R. S. NELSON  2,185,001
HEAT EXCHANGER
Filed June 14, 1935
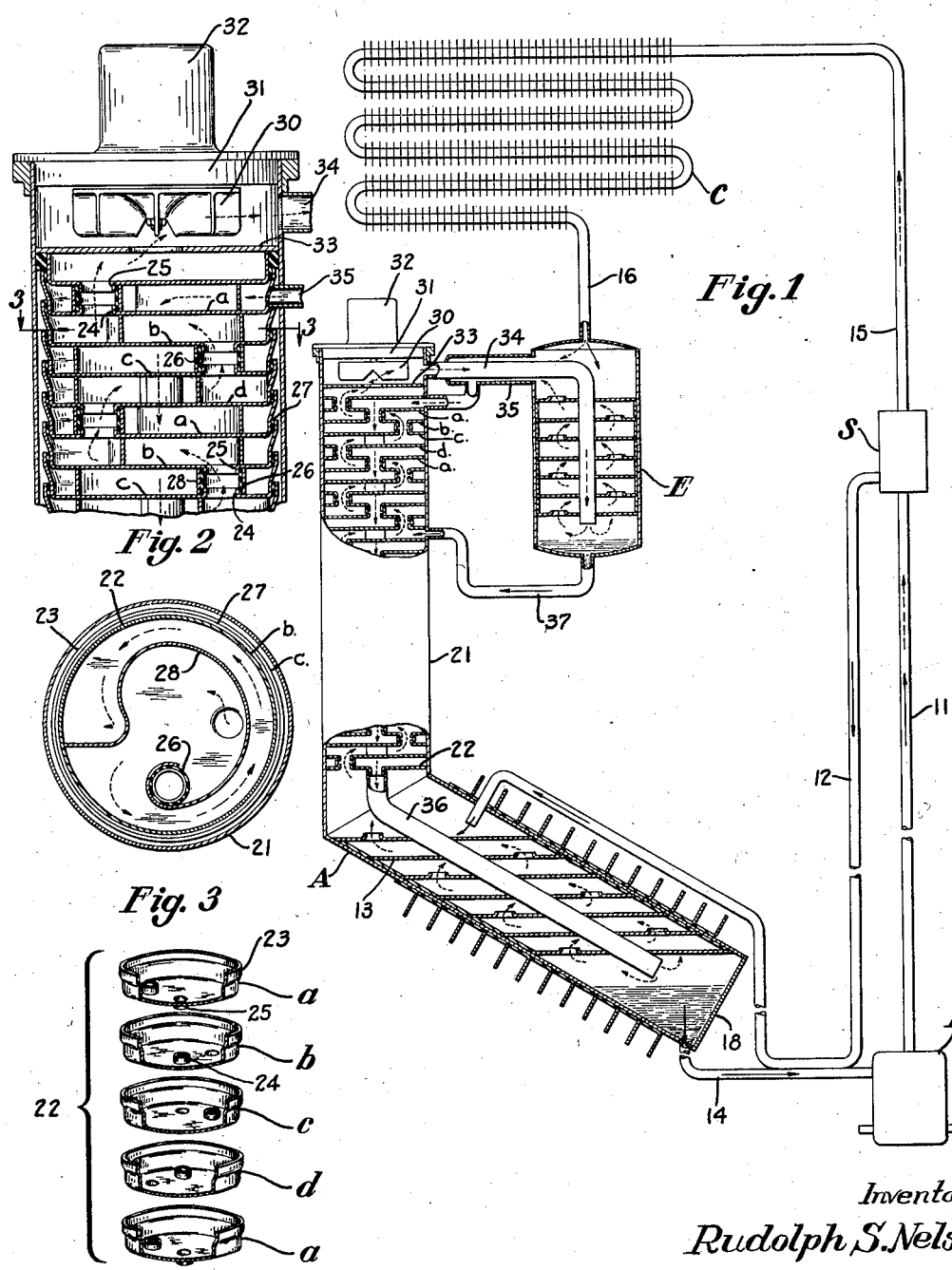
Inventor
Rudolph S. Nelson
BY Harry S. Demarse
ATTORNEY Patented Dec. 26, 1939

2,185,001

UNITED STATES PATENT OFFICE 2,185,001

HEAT EXCHANGER

Rudolph S. Nelson, Larchmont, N. Y., assignor to The Hoover Company, North Canton, Ohio, a corporation of Ohio Application June 14, 1935, Serial No. 26,594

7 Claims.  (Cl. 257—245)

This invention relates to continuous absorption refrigerating systems of the type in which an inert gas is employed and more particularly to means for circulating inert gas between the evaporator and absorber of such a system.

It is a principal object of the present invention to provide a gas heat exchanger for three-fluid absorption refrigerating systems which includes an outer vessel and an inner fabricated assembly of nested cups which are constructed and arranged to provide a plurality of tortuous gas paths in intimate heat exchange relationship.

It is one object of the present invention to provide power driven means for circulating the inert gas in a continuous absorption refrigerating system and to provide an efficient gas heat exchanger adapted for use therewith.

It is a further object of the invention to provide an efficient gas heat exchanger for use in absorption refrigerating systems which will provide a large heat transfer surface and one which will be easy to fabricate and assemble.

Further objects reside in certain novel features of the arrangement and construction of parts as will be apparent from the following description taken in connection with the accompanying drawing, in which:

Figure 1 is a diagram of a continuous absorption refrigerating unit, the figure roughly showing the absorber, evaporator and gas heat exchanger assembly in partial cross-section and illustrating how the gas flows therethrough;

Figure 2 is an enlarged vertical cross-sectional view of a portion of a gas heat exchanger which might be used as illustrated in Figure 1;

Figure 3 is a transverse cross-sectional view of the gas heat exchanger of Figure 2, the view being taken on the line 3—3 thereof; and Figure 4 is a fragmentary perspective view of a number of plates as used in the heat exchanger of Figures 1 to 3, the view showing the cups in expanded relation.

Referring to the drawing in detail and first to the diagram of Figure 1, it will be seen that a continuous absorption refrigerating system of the type in which inert gas is employed is illustrated as consisting of a boiler B, a vapor separation chamber S, a condenser C, an evaporator E, and an absorber A, connected by various conduits to complete the system. Thus, a conduit 11 connects the top of the boiler B to the vapor separation chamber S. This conduit may act as a vapor lift pump to convey liquid and vapor generated in the boiler B up into the vapor separation chamber S. From the vapor separation chamber S the liquid may flow into the absorber A through the conduit 12 and after flowing downwardly through the absorber over the baffle plates 13 therein flow back to the boiler B through the conduit 14, the conduits 12 and 14 being preferably in heat exchange relation as illustrated.

A conduit 15 connects the top of the vapor separation chamber S to the condenser C so that refrigerant vapor developed in the boiler B or in the vapor separation chamber S may be conveyed to the condenser, and after liquifying therein be conveyed into the evaporator E through the conduit 16.

The evaporator E may be of conventional construction, the arrangement illustrated consisting of a vertical tank closed at the top and bottom and provided with baffle plates therein.

One advantage of the present invention resides in the compact assembly of the absorber and gas heat exchanger. As disclosed in the copending application of Arnold D. Siedle Ser. No. 10,159 filed Mar. 9, 1935, for Absorbers for refrigerating systems, the advantages to be gained from placing the absorber in an inclined position are disclosed. The absorber used in the present invention may be like any one of those disclosed in the aforesaid copending case, the one here illustrated consisting of an inclined cylinder having elliptical shaped baffle plates 13 therein disposed horizontally, this vessel being closed at the bottom by an end plate 18 and being directly connected to the gas heat exchanger at its upper end.

The gas heat exchanger itself is shown diagrammatically in Figure 1 and is shown in detail in Figures 2, 3 and 4. It consists of a vertically disposed cylinder 21 capable of withstanding the pressures obtaining within the system and within which a number of cups 22 are assembled. As best shown in Figure 4, the cups 22 are identical in shape and construction. Each has a slightly expanded rim 23 adapted to receive the lower portion of the cup immediately above it.

In the bottom of each cup 22 two nipples are struck, one pointing upwardly as illustrated at 24 and the other downwardly, as illustrated at 25. These nipples are of the same length and are spaced equal distances from the centers of the bottoms of the cups. When a cup 22 is viewed from above, the nipple 24 appears spaced 90° to the right of the nipple 25.

If the succeeding cups are rotated 90° successively one below the other as illustrated at a, b, c and d of Figure 4, the downwardly extending nipple 25 on one cup will be disposed in juxtaposition to the upwardly extending nipple 24 on the cup immediately beneath it. It will thus be seen that although all of the cups 22 are identical two paths or circuits for gas to flow therethrough may be provided, if the nipples 24 are connected to the nipples 25.

The assembly of the cups 22 and connections is best illustrated in Figure 2. As there shown, each downwardly extending nipple 25 is connected to the upwardly extending nipple 24 on the cup immediately beneath it by means of a rubber sleeve 26. The rubber sleeves 26 make the assembly airtight, provided no great pressure difference exists between the two gas streams in the heat exchanger. They also act as insulators to prevent the transmission of heat from the warm end to the cold end of the heat exchanger assembly. To seal the cups from each other and to provide additional insulation, rubber rings 27 are also provided, these being placed between the expanded rim 23 of each cup and the lower portion of the next cup above it which is nested into this rim.

As best shown in Figures 2 and 3, a thin strip of metal 28 may be disposed in each cup 22, each strip being bent around one nipple 24 and extending around, somewhat concentrically with, and spaced inwardly from the rim of the cup for slightly over 270° from the nipple 24 where it engages the outer wall of the cup. This strip provides means for directing the flow of gases from the entrance to the cup around the outer surface thereof before passing through the exit in the cup. For clarity in illustrating, these strips 28 are not shown in Figures 1 and 4.

As diagrammatically illustrated in Figure 1 and as will be apparent from the study of the illustration in Figure 2 it will be seen that alternate cups have the same gas stream therein. In order to explain the flow of the gases the cups 22 have been designated with the letters a, b, c and d according to their locations. The space between the cups a and b is connected to the space between the cups c and d by the downwardly extending nipple 25 on the cup b and the upwardly extending nipple 24 on the cup c, these nipples being at the right of the heat exchanger as illustrated on the drawing. Likewise the space between the cups b and c is connected to the space between the cups d and a by the downwardly extending nipple 25 on the cup c and the upwardly extending nipple 24 on the cup d, these two nipples being at the rear of the heat exchanger as viewed in the drawing.

Likewise the space between the cups c and d is connected to the space between the cups a and b by the downwardly extending nipple 25 on the cup d and the upwardly extending nipple 24 on the cup a, these two nipples being on the left side of the heat exchanger as viewed in the drawing.

Likewise, the space between the cups d and a is connected to the space between the cups b and c by the nipple 25 on cup a, and the nipple 24 on cup b, these nipples being at the front of the heat exchanger as viewed in the drawing.

Thus, one stream of gas may flow upwardly through the gas heat exchanger, passing from the space between the cups a and b to the left, then upwardly into the space between the cups c and d, across this space to the right and upwardly into the space between the cups a and b and into the left again, this flow being back and forth across the plane of the paper (Figures 1 and 2) insofar as the inlet and outlet to each space is concerned, it being understood that the strip 28 in all cases causes the gas to flow around the outside of the gas heat exchanger in passing from the entrance to the exit of the space between any two cups.

Likewise a second stream of gas may pass downwardly through the gas heat exchanger from the space between cups d and a in front of the plane of the paper (Figure 2) then rearwardly between the cups b and c and downwardly behind the plane of the paper into the space between the cups d and a where it comes forward again, this flow also being directed by baffle plates 28.

Thus by the provision of a number of simple cups which may be mere stampings of metal, a very long path for the flow of gases through the heat exchanger is provided and the two streams are again and again brought into heat exchange relation.

The path for the flow of gases through the heat exchanger is so long that the flow therethrough would be extremely slow unless induced by some means other than gravity. Accordingly, a centrifugal fan is connected into the inert gas circuit. This fan might be mounted upon the absorber as in the arrangements in the copending application Ser. No. 10,159 referred to above, but it is preferably mounted, as shown at 30, above the stack of cups in the top of the gas heat exchanger assembly.

The fan 30 may be mounted upon a shaft supported by suitable bearings in the end piece 31 at the top of the gas heat exchanger and be driven by an electric motor of any suitable type as indicated at 32, this motor being preferably hermetically sealed to the gas heat exchanger, either with the rotor inside and the field outside of the sealing means, or with the entire motor within the casing or entirely encased, both forms being well known.

To provide a fan eye for the centrifugal fan 30 a plate 33 is located immediately beneath it and this plate is provided with a central opening.

The fan 30 may discharge into a conduit 34 which passes from the periphery of the fan chamber into the evaporator E and preferably is connected to the lower portion thereof.

For providing a return path for the flow of gas from the evaporator to the gas heat exchanger, a conduit 35 is connected to the top thereof and to the space just above the upper cup 22 therein.

As illustrated in Figure 1 the lower end of the gas heat exchanger may be welded, at an angle, to the inclined absorber A and the lower cup 22 may have its depending nipple 25 connected to a conduit 36 which extends through the baffle plates 13 in the absorber so as to convey the inert gas to the lower end thereof.

As shown in Figure 1, gas propelled by the fan 30 thus flows through the conduit 34, upwardly through the evaporator E, through the conduit 35, downwardly through the gas heat exchanger as explained above, through the conduit 36 into the bottom of the absorber, thence upwardly through the absorber across the baffle plates 13, and from there upwardly through the gas heat exchanger in the manner explained above, back to the fan 30.

The assembly of the absorber and gas heat exchanger is such that it may be readily mounted along the back and bottom portion of a refrigerator cabinet. The heat exchanger may be wholly or partly covered with insulation or be mounted in the wall of the cabinet so as to occupy a minimum of space.

A conduit 37 may be connected to the bottom of the evaporator and to any suitable point in the gas heat exchanger or to the absorber to provide means for draining the evaporator of any liquid which may not evaporate therein.

While only one embodiment of the invention has been shown and described herein, it is obvious that the invention may be embodied in other constructional forms. Other forms of connectors may be substituted for the rubber sleeves 26 and the rubber rings 27 may be dispensed with. If the nipples 24 are made slightly longer and larger than those shown in the drawing, the nipples 25 may be pressed into them with an airtight fit, as the lower portions of the cups 22 are pressed into the expanded rims 23. Various other changes may be made in the construction without departing from the spirit of the invention or the scope of the annexed claims.

I claim:

1. A heat exchanger adapted for use in transferring heat from one stream of fluid therein to another stream of fluid therein, said heat exchanger including a plurality of nested cups each of which has two nipples thereon extending in opposite directions, said cups being identical in construction and being disposed in different angular positions to bring the nipples extending in one direction into juxtaposition with the nipples extending in the opposite direction, and means for connecting said nipples to provide paths for the flow of two streams of fluid through said cups.

2. A heat exchanger comprising a plurality of nested cup elements, conduit elements projecting form each sied of each of said cups, and means connecting the conduit element projecting inwardly of each cup with a conduit element projecting outwardly of another cup, the conduit elements of each cup being spaced 90° from the corresponding conduit elements on adjacent cups.

3. A heat exchanger comprising a plurality of nested cup elements, conduit elements projecting from each side of each of said cups, means connecting the conduit element projecting inwardly of each cup with a conduit element projecting outwardly of another cup, the conduit elements of each cup being spaced 90° from the corresponding conduit elements on adjacent cups, and a baffle plate positioned within each of said nested cups.

4. A heat exchanger comprising a plurality of spaced apart heat transfer walls, means connecting the space between each pair of said walls with the spaces between spaced pairs of walls on opposite sides of said first mentioned pair of walls, and baffle plates in each of said spaces, said baffles being shaped to direct fluid passing through said spaces in a spiral path, the baffles in adjacent spaces being angularly displaced.

5. A heat exchanger comprising a plurality of spaced apart plates each of which is provided with a pair of spaced openings, said plates being identical in construction and being disposed at different angular positions to bring the openings in each plate into juxtaposition with the non-corresponding openings in adjacent plates, and means for connecting the juxtaposed openings to provide paths for the flow of two streams of fluid through and across said plates.

6. A heat exchanger comprising a plurality of spaced apart plates each of which is provided with a pair of spaced openings, said plates being identical in construction and being disposed at different angular positions to bring the openings in each plate into juxtaposition with the non-corresponding openings in adjacent plates, means for connecting the juxtaposed openings to provide paths for the flow of two streams of fluid through and across said plates, and angularly displaced baffles arranged between each pair of plates for directing fluids flowing therethrough in a spiral path.

7. A heat exchanger comprising a plurality of spaced apart plates each of which is provided with a pair of spaced openings, said plates being identical in construction and being disposed at different angular positions to bring the openings in each plate into juxtaposition with the non-corresponding openings in adjacent plates, and means for connecting the juxtaposed openings to provide paths for the flow of two streams of fluid through and across said plates, said connecting means including means for thermally insulating adjacent plates whereby to prevent flow of heat therebetween.

RUDOLPH S. NELSON.